United States Patent [19]

Harwood, III

[11] Patent Number: 5,644,756

[45] Date of Patent: Jul. 1, 1997

[54] INTEGRATED CIRCUIT DATA PROCESSOR WITH SELECTABLE ROUTING OF DATA ACCESSES

[75] Inventor: Wallace B. Harwood, III, Austin, Tex.

[73] Assignee: Motorola, Inc., Schaumburg, Ill.

[21] Appl. No.: 418,348

[22] Filed: Apr. 7, 1995

[51] Int. Cl.$^6$ ..................................... G06F 13/14
[52] U.S. Cl. .................. 395/500; 395/308; 395/310; 395/311; 395/280; 395/800; 364/240; 364/260; 364/DIG. 1
[58] Field of Search ................... 395/375, 575, 395/400, 425, 325, 287, 308, 858, 857, 306, 800; 364/222.5, 238, 243, 259, 259.1, 259.8, 240, 260, DIG. 1; 370/54

[56] References Cited

U.S. PATENT DOCUMENTS

| | | | |
|---|---|---|---|
| Re. 30,671 | 7/1981 | Poland | 364/706 |
| 4,079,456 | 3/1978 | Lunsford et al. | 364/200 |
| 4,131,944 | 12/1978 | Mager et al. | 395/287 |
| 4,434,462 | 2/1984 | Guttag et al. | 395/375 |
| 4,441,154 | 4/1984 | McDonough et al. | 395/800 |
| 4,521,852 | 6/1985 | Guttag | 395/490 |
| 4,523,271 | 6/1985 | Levien | 364/200 |
| 4,590,552 | 5/1986 | Guttag et al. | 364/200 |
| 4,715,013 | 12/1987 | MacGregor et al. | 364/900 |
| 4,802,119 | 1/1989 | Heene et al. | 364/900 |
| 4,870,302 | 9/1989 | Freeman | 326/41 |
| 4,975,870 | 12/1990 | Knicely et al. | 364/900 |
| 5,014,191 | 5/1991 | Padgaonkar et al. | 364/200 |
| 5,056,009 | 10/1991 | Mizuta | 364/200 |
| 5,067,077 | 11/1991 | Wakimoto et al. | 395/400 |
| 5,107,417 | 4/1992 | Yokoyama | 395/500 |
| 5,222,226 | 6/1993 | Yamaguchi et al. | 395/425 |
| 5,247,621 | 9/1993 | Gulick | 395/325 |
| 5,251,304 | 10/1993 | Sibigtroth et al. | 395/575 |
| 5,307,464 | 4/1994 | Akao et al. | 395/325 |
| 5,428,770 | 6/1995 | Garner | 395/575 |

*Primary Examiner*—Kevin J. Teska
*Assistant Examiner*—Thai Phan
*Attorney, Agent, or Firm*—Paul J. Polansky

[57] ABSTRACT

An integrated circuit data processor (30) includes a central processing; unit (31) with separate internal instruction (32) and load/store (33) buses. The data processor (30) includes a nonvolatile memory (34) connected to the instruction bus (32). In a first mode of operation, a system integration unit (36) allows cross-bus accesses from the load/store bus (33) to the nonvolatile memory (34) on the instruction bus (32). These cross-bus accesses allow the central processing unit (31) to access system parameters from the same nonvolatile memory (34) which stores the program. In a second mode of operation, a control bit in the system integration unit (36) routes accesses from the load/store bus (33) to the nonvolatile memory (34) off-chip. The central processing unit (31) continues to access instructions from the nonvolatile memory (34) in the second mode. In this way, system parameters normally stored in the nonvolatile memory (34) may be accurately calibrated.

17 Claims, 2 Drawing Sheets

INTEGRATED CIRCUIT DATA PROCESSOR WITH SELECTABLE ROUTING OF DATA ACCESSES

FIELD OF THE INVENTION

This invention relates generally to data processing systems, and more particularly, to integrated circuit data processors with dual internal buses.

BACKGROUND OF THE INVENTION

Recent advances in integrated circuit fabrication technology have increasingly allowed more circuits to be manufactured in smaller areas. These technological advances have resulted in two trends in commercial integrated circuit data processors. First, data processors have combined central processing units (CPUs) with other computer system components such as memory and peripheral circuits on a single integrated circuit chip. For example, the data processor will typically incorporate some form of nonvolatile memory on-chip to store its operating program. Many forms of nonvolatile memory exist, such as read only memory (ROM), erasable programmable ROM (EPROM), electrically erasable programmable ROM (EEPROM or E$^2$PROM), flash EEPROM or E$^2$PROM, and the like. Besides reducing the cost of the data processor, on-chip nonvolatile memory may be accessed faster than comparable external memory.

The second trend involves the increasing sophistication of the CPU. Early data processors incorporated simple CPUs having single 8-bit data paths and simple instruction sets. More recently, data processors have been built using CPUs with 16- and 32-bit data paths with full Harvard bus architectures (separate instruction and data buses) and supporting reduced instruction set computer (RISC) programming.

However, the increasing integration of components and sophistication of CPUs have created new problems which demand new solutions. One of these problems relates to the fact that data processors frequently incorporate nonvolatile memory on-chip in order to store program instructions. During system development, it is helpful for the data processor to get the control program from external memory rather than nonvolatile memory. Thus, a useful feature is the ability to cause accesses to the on-chip nonvolatile memory to be routed off-chip. In this way, the program may be modified until it works correctly. Once the program is debugged, it may be loaded into the on-chip nonvolatile memory.

One example of a data processor with on-chip memory which allows accesses to on-chip memory to be selectively re-routed off-chip is the DSP56000 available from Motorola, Inc. The DSP56000 is has dual internal data buses each connecting to its own nonvolatile memory. A control register includes a control bit known as the development mode or "DE" bit which, when set, causes memory accesses to the internal nonvolatile memories to be re-routed to an external memory.

Another reason to route accesses off-chip relates to the fact that certain operating parameters are frequently stored in nonvolatile memory. For example, in the case of an automobile engine controller, these operating parameters might include spark and fuel timing profiles over different operating conditions such as temperature, engine speed (revolutions per minute or RPMs), engine load, atmospheric pressure, etc. During the lifetime of the automobile, it may be necessary to re-calibrate these operating parameters to reflect changes in the system. Thus, it would generally be desirable for an access by the CPU to an operating parameter stored in nonvolatile memory to be selectively routed off-chip. Then, the parameter value can be optimized and then re-stored in the on-chip nonvolatile memory.

However, storing parameters in the same nonvolatile memory as the program creates a problem when the parameters are re-calibrated. Off-chip accesses to the nonvolatile memory change the operation of the program itself because off-chip accesses take longer than accesses to the internal memory. If the system is re-calibrated while the program is running from off-chip memory, then the calibrated parameter values may not be optimal when the program is again run from internal memory. What is needed then is an integrated circuit data processor which allows the use of a single nonvolatile memory but which allows more exact calibration of parameters. The present invention provides such an integrated circuit data processor, and these and other features and advantages will be more clearly understood from the following detailed description taken in conjunction with the accompanying drawings.

DETAILED DESCRIPTION OF A PREFERRED EMBODIMENT

A data processor according to the present invention allows a central processing unit's (CPU's) parameter accesses to be selectively routed off-chip while the program is running normally from on-chip memory. Thus, these parameters may be re-calibrated to optimal values.

This advantage is achieved with an integrated circuit data processor having an internal Harvard architecture; the CPU accesses the parameters via a load/store bus and accesses the program instructions through an instruction bus. The data processor includes a common nonvolatile memory which is coupled to the instruction bus. One portion of the nonvolatile memory stores program instructions. Another, typically much smaller portion of the nonvolatile memory stores parameters. During a first (normal) mode of operation, a system integration unit recognizes a load/store bus access to the parameters, and causes the access to be routed to the internal instruction bus. The system integration unit recognizes an instruction bus access to the program instructions, and causes the access to be completed on the instruction bus.

During another (debug) mode of operation, the system integration unit recognizes a load/store access to the parameters but instead of causing the access to be routed to the instruction bus, causes the access to be routed to an external bus instead. In the debug mode, the system integration unit recognizes an instruction accesses to the program instructions, yet still causes the access to be completed on the instruction bus. This operation allows the instructions to continue to execute from the same on-chip nonvolatile memory as during the normal operation mode. Thus, the parameters may be accurately calibrated in the debug mode because the data processor more accurately mimics operation during the normal mode.

Figure 1:
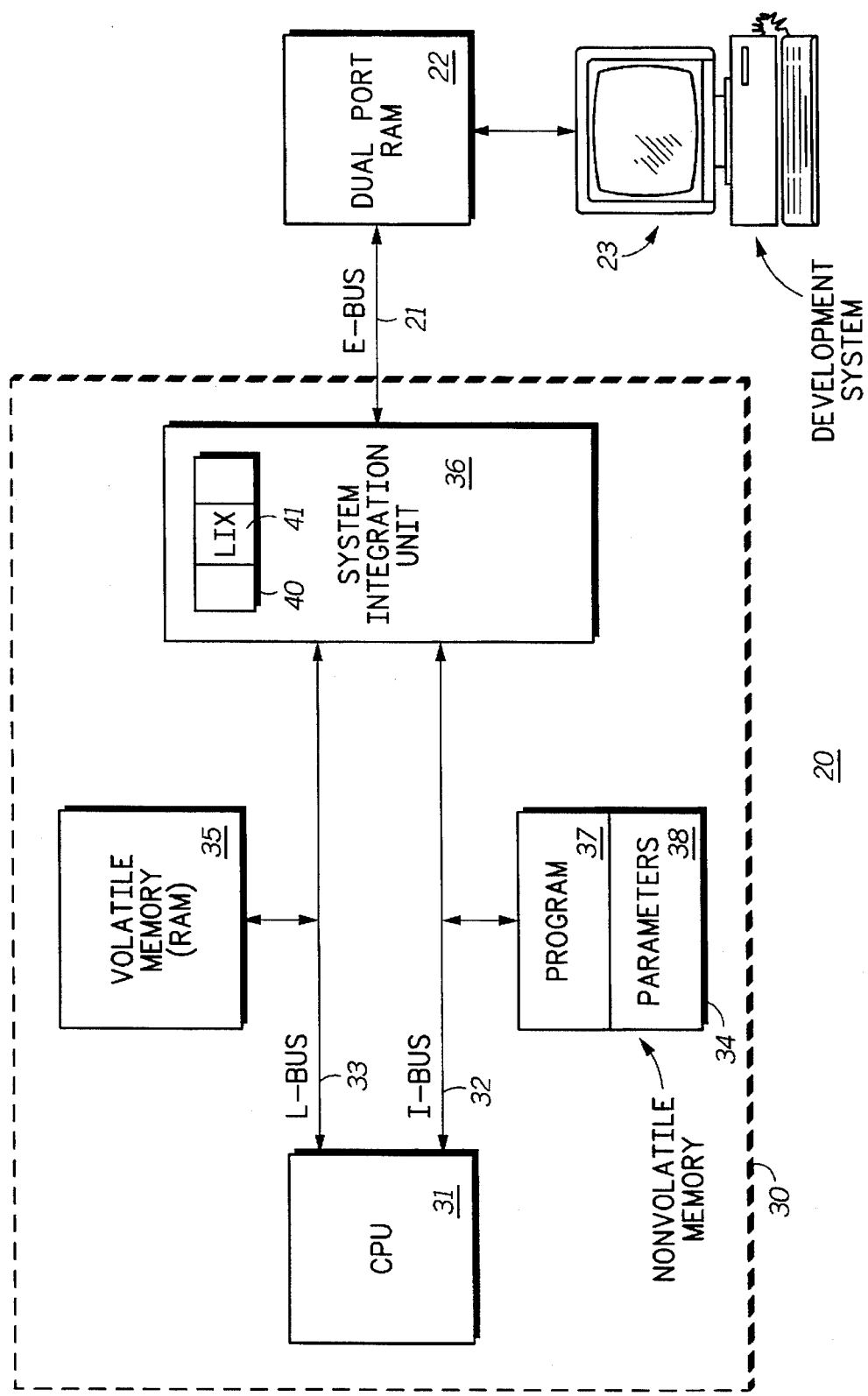
FIG. 1 illustrates in block diagram form a data processing system including a data processor according to the present invention.

These advantages are best understood with reference to FIG. 1, which illustrates in block diagram form a data processing system 20 including a data processor 30 according to the present invention. Data processor 30 is connected via an external bidirectional bus labelled "E-BUS" 21 to a first port of a dual ported random access memory (RAM) 22. RAM 22 has a second port for connection to a development system 23. By having the second port, RAM 22 allows certain system parameters to be changed interactively and calibrated while the system using data processor 30 is operating. The effects of the change can then be measured and the parameter values changed again if necessary.

Data processor 30 includes a central processing unit (CPU) 31 which has a Harvard architecture, i.e., separate instruction and load/store buses. An instruction bus or "I-BUS" 32 is connected to the instruction bus of CPU 31 and a load/store bus or "L-BUS" 33 is connected to the load/store bus of CPU 31. Note that as used here, I-BUS 32 conducts address and attribute signals which are outputs of CPU 31, and data signals which are bidirectional, input/output signals of CPU 31. CPU 31 performs an I-BUS access by providing an address to the address portion of I-BUS 32 to identify the next instruction to be fetched. CPU 31 also provides a corresponding set of attributes to I-BUS 32. The attributes define other characteristics of the access, for example whether the access is a supervisor or user access, a burst cycle indication, and a read/write signal. Similarly, L-BUS 33 provides address and attribute signals which are outputs of CPU 31, and conducts data signals which are bidirectional, input/output signals of CPU 31 representing the data element to be loaded or stored.

In order to increase the integration level, data processor 30 also includes a nonvolatile memory 34, a volatile memory 35, and a system integration unit (SIU) 36. Nonvolatile memory 34 is connected to I-BUS 32, and has two main portions. A first portion 37 labelled "PROGRAM" stores program instructions for CPU 31; a second portion 38 labelled "PARAMETERS" stores operating; parameters. The boundary between these portions is not set by hardware circuitry but rather is determined by the PROGRAM itself and thus may be altered for different applications. CPU 31 accesses PROGRAM portion 37 through I-BUS 32 and PARAMETERS portion 38 through L-BUS 33. Accessing parameters in nonvolatile memory 34 through L-BUS 33 is known as a cross bus access, which requires SIU 36 to route the L-BUS cycle to I-BUS 32.

As used in this context, the term "routes" or "routing" refers to a bus cycle inflated on one bus and completed on another bus. In data processor 30, CPU 31 and possibly other peripheral controller circuits, not shown in FIG. 1, are capable of taking control of the internal buses. Thus, a bus cycle started on L-BUS 33 must await arbitration for I-BUS 32 before completion. After the arbitration is completed, SIU 36 provides the L-BUS address to I-BUS 32, causing nonvolatile memory 34 to complete the data access. Nonvolatile memory 34 then provides the accessed data on I-BUS 32, and SIU 36 provides the I-BUS data to L-BUS 33. The access is completed by SIU 36 providing appropriate control signals to CPU 31 to terminate the access.

Generally, CPU 31 accesses program instructions from nonvolatile memory 34 on I-BUS 32, and data from volatile memory 35 on L-BUS 33. CPU 31 may access memory-mapped peripherals and registers located on I-BUS 32 and L-BUS 33 as well. If CPU 31 accesses a memory location not within the addressing range of nonvolatile memory 34 or volatile memory 35, or of any other memory-mapped device, then SIU 36 causes the access to occur on E-BUS 21. This generally requires an arbitration for E-BUS 21 and requires additional clock cycles to complete.

SIU 36 includes a register 40 known as the "MEMMAP" register. An L-BUS to I-BUS Cross Bus Access Enable bit 41 labelled "LIX" defines two modes of operation. In the first mode of operation (LIX=1), cross bus accesses from L-BUS 33 to I-BUS 32 are enabled. In the preferred embodiment, accesses from I-BUS 32 to L-BUS 33 are always enabled. Thus, CPU 31 can access PROGRAM portion 37 of nonvolatile memory 34 through I-BUS 32 and PARAMETERS portion 38 through L-BUS 33. This mode corresponds to normal operation mode.

In the second mode of operation (LIX=0), cross-bus accesses from L-BUS 33 to I-BUS 32 are disabled. Thus, if CPU 31 attempts to access PARAMETERS portion 38 through L-BUS 33, system integration unit 36 routes the access off-chip through E-BUS 21. In the illustrated embodiment, when CPU 31 makes such an access, SIU 36 routes the access to dual-port RAM 22 via E-BUS 21. Thus, development system 23 can change the parameters interactively. Once optimum values are chosen then the parameters may be stored in PARAMETERS portion 38. In addition in debug mode, SIU 36 continues to allow CPU 31 to access program memory 37 through I-BUS 32. Thus, these accesses stay on-chip and data processor 30 behaves almost exactly the same as when the parameters are stored on-chip.

One source of timing variation in program operation, however, occurs because the L-BUS parameter accesses are routed off-chip. With a smaller demand on I-BUS 32, the program runs slightly faster. In order to alleviate this inaccuracy, in an alternate embodiment, all L-BUS accesses to parameters could require that SIU 36 arbitrate for I-BUS 32, before completing the access by fetching data via E-BUS 21.

Figure 2:
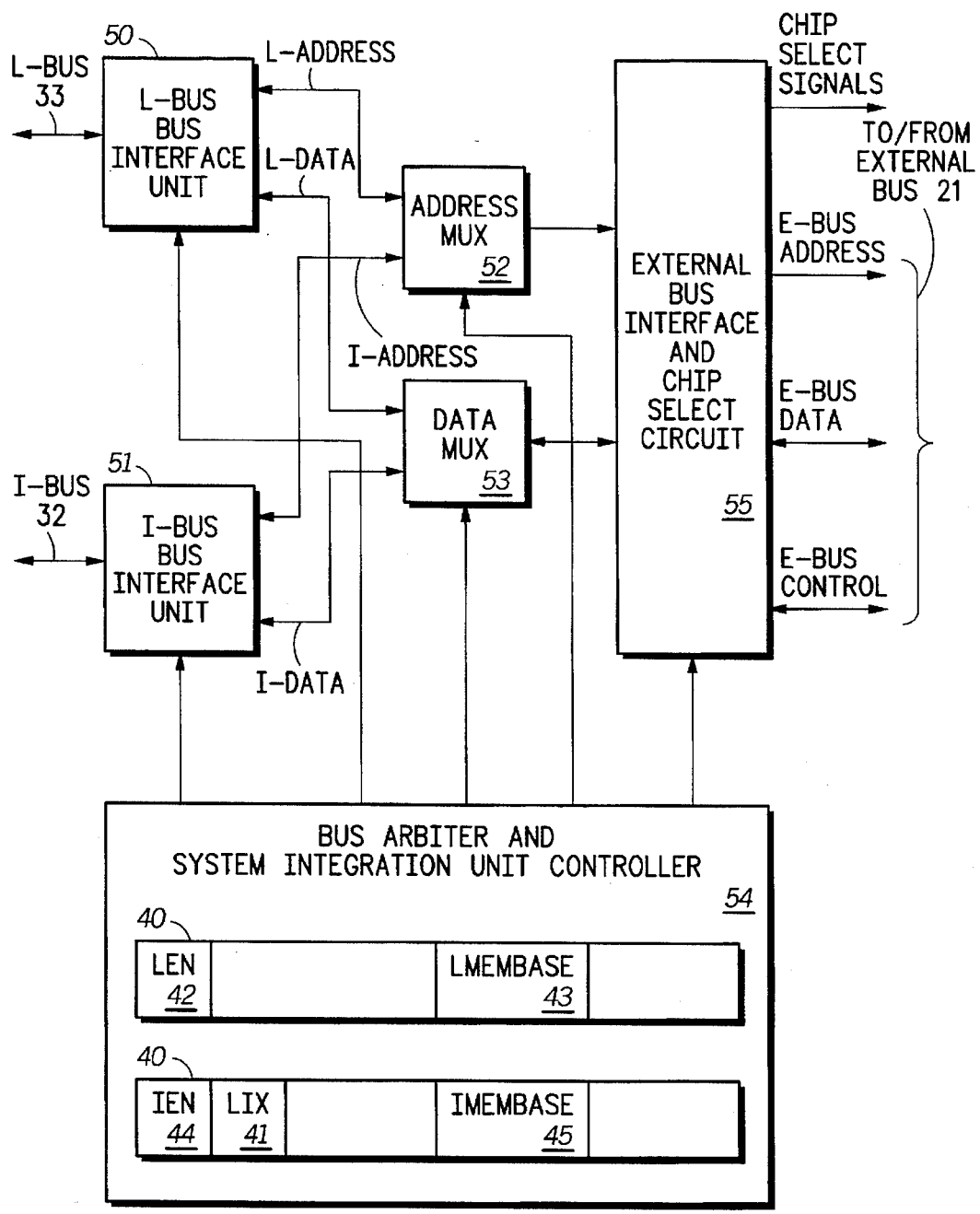
FIG. 2 illustrates in block diagram form a portion of the system integration unit of the data processor of FIG. I useful in understanding the present invention.

FIG. 2 illustrates in block diagram form a portion of SIU 36 of data processor 30 of FIG. 1 useful in understanding the present invention. SIU 36 includes generally an L-BUS bus interface unit (BIU) 50, an I-BUS BIU 51, an address multiplexer (MUX) 52, a data MUX 53, a bus arbiter and SIU controller 54, and an external bus interface and chip select circuit 55.

BIU 50 has a first input/output terminal connected to L-BUS 33, a second input/output terminal for conducting signals labelled "L-ADDRESS", and a third input/output terminal for conducting signals labelled "L-DATA". When routing an L-BUS 33 access to either I-BUS 32 or to E-BUS 21, BIU 50 separates the address signals of L-BUS 33 and provides the L-ADDRESS as an output to the second input/output terminal. During a read cycle from L-BUS 33, BIU 50 receives the L-DATA on the third input/output terminal as an input and provides it to L-BUS 33. During a write cycle from L-BUS 33, BIU 50 separates the data signals of L-BUS 33 and provides the L-DATA as an output on the third input/output terminal. When routing an I-BUS 32 access to L-BUS 33, BIU 50 receives the L-ADDRESS as an input on the second input/output terminal, and provides it to the address portion of L-BUS 33. During a read cycle from I-BUS 32, BIU 50 separates the data signals of L-BUS 33 and provides the L-DATA as an output on the third input/output terminal. During a write cycle from I-BUS 32, BIU 50 receives the L-DATA on the third input/output terminal as an input and provides it to L-BUS 33.

BIU 51 has a first input/output terminal connected to I-BUS 32, a second input/output terminal for conducting signals labelled "I-ADDRESS", and a third input/output terminal for conducting signals labelled "I-DATA". When routing an I-BUS 32 access to either L-BUS 33 or to E-BUS 21, BIU 51 separates the address signals of I-BUS 32 and provides the I-ADDRESS as an output to the second input/output terminal. During a read cycle from I-BUS 32, BIU 51 receives the I-DATA on the third input/output terminal as an input and provides it to I-BUS 32. During a write cycle from I-BUS 32, BIU 51 separates the data signals of I-BUS 32 and provides the I-DATA as an output on the third input/output terminal. When routing an L-BUS 33 access to I-BUS 32, BIU 51 receives the I-ADDRESS as an input on the second input/output terminal, and provides it to the address portion of I-BUS 32. During a read cycle from L-BUS 33, BIU 51 separates the data signals of I-BUS 32 and provides the I-DATA as an output on the third input/output terminal. During a write cycle from L-BUS 33, BIU 51 receives the I-DATA on the third input/output terminal as an input and provides it to I-BUS 32.

Address MUX 52 has a first input/output terminal connected to L-BUS BIU 50 for conducting the L-ADDRESS, a second input/output terminal connected to I-BUS BIU 51 for conducting the I-ADDRESS, a control input connected an output of bus arbiter and SIU controller 54, and a bidirectional connection to an input/output terminal of external bus interface and chip select circuit 55. Address MUX 52 operates to control the transfer of address signals from any one of L-BUS BIU 50, I-BUS BIU 51, and external bus interface and chip select circuit 55, to any other one of L-BUS BIU 50, I-BUS BIU 51, and external bus interface and chip select circuit 55, under the control of bus arbiter and SIU controller 54.

Data MUX 53 has a first input/output terminal connected to L-BUS BIU 50 for conducting the L-DATA, a second input/output terminal connected to I-BUS BIU 51 for conducting the I-DATA, a control input connected an output of bus arbiter and SIU controller 54, and a bidirectional connection to an input/output terminal of external bus interface and chip select circuit 55. Data MUX 53 operates to control the transfer of data from any one of L-BUS BIU 50, I-BUS BIU 51, and external bus interface and chip select circuit 55, to any other one of L-BUS BIU 50, I-BUS BIU 51, and external bus interface and chip select circuit 55, under the control of bus arbiter and SIU controller 54.

Bus arbiter and SIU controller 54 is a conventional logic state machine designed to arbitrate between various bus masters capable of performing bus cycles on the internal buses. These conventional features will not be discussed in detail. Of particular interest to understanding the present invention, however, bus arbiter and SIU controller 54 includes MEMMAP register 40. MEMMAP register 40 includes an L-BUS Memory Enable bit 42 labelled "LEN". When set (LEN=1), LEN bit 42 enables accesses to volatile memory 35 on L-BUS 33. When cleared (LEN=0), any access to volatile memory 35 causes the access to take place on E-BUS 21. An L-BUS Memory Base field 43 labelled "LMEMBASE" determines the starting address of volatile memory 35. In the illustrated embodiment, the size of volatile memory 35 is fixed, but it may be programmable in other embodiments. Bus arbiter and SIU controller 54 determines whether the L-BUS address is within the address space of volatile memory 35. If the address is within the address space and if LEN bit 42 is s,et, bus arbiter and SIU controller 54 causes the access to take place on L-BUS 33. Otherwise the access takes place on E-BUS 21.

Similarly, an I-BUS Memory Enable bit 44 labelled "IEN" enables accesses to nonvolatile memory 34 on I-BUS 32, and an I-BUS Memory Base field 45 labelled "IMEMBASE" determines its starting address. As with L-BUS accesses, bus arbiter and SIU controller 54 determines whether the address is within the address space of nonvolatile memory 34. If so, and if IEN bit 42 is set, bus arbiter and SIU controller 54 causes the access to take place on I-BUS 33. Otherwise the access is conducted on E-BUS 21. Clearing the IEN bit (IEN =0) allows accesses to nonvolatile memory 35 to be routed off chip and is useful for code development.

LIX bit 41 determines whether cross-bus accesses from L-BUS 33 to I-BUS 32 are allowed. When set (LIX=1), cross-bus accesses from L-BUS 33 to I-BUS 32 are allowed. LIX bit 41 is generally set when data processor 30 is in normal operation mode, enabling L-BUS accesses to PARAMETERS portion 38 in nonvolatile memory 34. Note that the L-BUS address must be within the address space of nonvolatile memory 34; otherwise, the access takes place on E-BUS 21. When cleared (LIX=0), L-BUS accesses to I-BUS 32 are disabled, regardless of the L-BUS address. This operation corresponds to debug mode.

In the illustrated embodiment, both volatile memory 35 and bus arbiter and SIU controller 54 simultaneously decode the address for L-BUS 33 accesses. After decoding the address, bus arbiter and SIU controller 54 provides signals LEN and LMEMBASE to volatile memory 35 which either causes it to complete the access, or prevents the access from being completed and routes the access to E-BUS 21, as appropriate. Likewise, both nonvolatile memory 34 and bus arbiter and SIU controller 54 simultaneously decode the address for I-BUS 32 accesses. After decoding the address, bus arbiter and SIU controller 54 provides signals IEN and IMEMBASE to nonvolatile memory 34 which either causes it to complete the access, or prevents the access from being completed and routes the access to E-BUS 21, as appropriate.

External bus interface and chip select circuit 55 has an input terminal connected to the output terminal of address MUX 52, a bidirectional input/output terminal connected to the input/output terminal of data MUX 53, a control input terminal connected to bus arbiter and SIU controller 54, a chip select output terminal, and a bidirectional connection to E-BUS 21. External bus interface and chip select circuit 55 performs two main functions. First, the chip select function is performed by storing address and attribute information for any of a number of programmable regions. In response to detecting a match in a region, external bus interface and chip select circuit 55 activates one or more signals of a set of signals labelled "CHIP SELECT SIGNALS" to directly control external memory chips. Such signals include the standard static random access memory (SRAM) control signals known as chip enable ($\overline{CE}$), write enable ($\overline{WE}$), and output enable ($\overline{OE}$).

Second, the external bus interface function includes both arbitration for E-BUS 21, and signal timing. FIG. 2 shows in greater detail the connection of external bus interface and chip select circuit 55 to E-BUS 21, including an address output terminal for conducting signals labelled "E-BUS ADDRESS", a bidirectional input/output terminal for conducting data signals labelled "E-BUS DATA", and a bidirectional input/output terminal for conducting control signals labelled "E-BUS CONTROL". The operation of these signals is conventional and will not be described further.

Thus, data processor 30 allows more accurate calibration of parameters which are normally stored in on-chip nonvolatile memory. This result is achieved by utilizing the CPU's dual-bus structure to allow instruction bus accesses to the nonvolatile memory to proceed normally while at the same time diverting load/store bus accesses to the nonvolatile memory off-chip. Thus, instruction fetching and program execution take place substantially the same as during normal operation, while the parameters may be interactively changed in external memory.

While the invention has been described in the context of a preferred embodiment, it will be apparent to those skilled in the art that the present invention may be modified in numerous ways and may assume many embodiments other than that specifically set out and described above. For example, the load/store values stores in nonvolatile memory were described as operating parameters; other possible values include data tables, calibration constants, and the like. Also, any type of dual-bus CPU architecture may be used, such as complex instruction set computer (CISC), reduced instruction set computer (RISC), digital signal processor (DSP), integer or floating point processor, and the like. Accordingly, it is intended by the appended claims to cover all modifications of the invention which fall within the true spirit and scope of the invention.

I claim:

1. An integrated circuit data processor with selectable routing of data accesses, comprising:

an internal instruction bus;

an internal load/store bus;

a nonvolatile memory coupled to said internal instruction bus, having a first portion for storing a plurality of program instructions, and a second portion for storing a plurality of parameters;

a central processing unit coupled to said internal instruction bus and to said internal load/store bus, for performing instruction accesses via said internal instruction bus and for performing load/store accesses via said internal load/store bus; and a system integration unit coupled to said internal instruction bus, to said internal load/store bus, and to an external bus;

said system integration unit having a register for placing said system integration unit into a selected one of first and second modes;

while in said first mode, said system integration unit routing load/store accesses to said second portion of said nonvolatile memory, to said internal instruction bus;

while in said second mode, said system integration unit routing load/store accesses to said second portion of said nonvolatile memory, to said external bus, and enabling accesses to said nonvolatile memory from said internal instruction bus;

whereby accesses to said plurality of parameters may be selectively routed to said external bus during calibration.

2. The integrated circuit data processor of claim 1 further comprising a volatile memory coupled to said internal load/store bus.

3. The integrated circuit data processor of claim 1 wherein said register includes a control bit for determining whether accesses to said nonvolatile memory are to be routed to said external bus.

4. The integrated circuit data processor of claim 1 wherein said internal load/store bus includes an address portion, an attribute portion, and a data portion, and wherein said system integration unit detects a load/store access to said nonvolatile memory by detecting that an address conducted on an address portion of said internal load/store bus is within a predetermined range.

5. The integrated circuit data processor of claim 1 wherein said system integration unit routes a load/store access to said nonvolatile memory to said internal instruction bus by arbitrating for said internal instruction bus and then performing a corresponding access on said internal instruction bus.

6. The integrated circuit data processor of claim 5 wherein said system integration unit performs said corresponding access on said internal instruction bus by activating a control signal to enable said nonvolatile memory.

7. The integrated circuit data processor of claim 1 wherein said system integration unit routes a load/store access to said external bus by arbitrating for said external bus and then performing a corresponding access on said external bus.

8. An integrated circuit data processor with selectable routing of data accesses, comprising:

a first internal bus having an address portion and a data portion;

a second internal bus having an address portion and a data portion;

a central processing unit coupled to said first internal bus and said second internal bus, for performing memory accesses via each of said first internal bus and said second internal bus;

a nonvolatile memory coupled to said first internal bus; and a system integration unit coupled to said first internal bus, said second internal bus, and an external bus;

said system integration unit having a register for placing said system integration unit into a selected one of first and second modes;

while in said first mode, said system integration unit routes accesses by said central processing unit to said nonvolatile memory from said second internal bus, to said first internal bus;

while in said second mode, said system integration unit routes accesses by said central processing unit to said nonvolatile memory from said second internal bus, to said external bus, and enables accesses to said nonvolatile memory from said first internal bus.

9. The integrated circuit data processor of claim 8 wherein said register includes a control bit for determining whether accesses to said nonvolatile memory are to be routed to said external bus.

10. The integrated circuit data processor of claim 8 wherein said system integration unit routes an access by said central processing unit to said nonvolatile memory from said second internal bus, to said first internal bus by arbitrating for said first internal bus and then performing a corresponding access on said first internal bus.

11. The integrated circuit data processor of claim 10 wherein said system integration unit performs said corresponding access on said first internal bus by activating a control signal to enable said nonvolatile memory.

12. The integrated circuit data processor of claim 8 wherein said system integration unit routes an access by said central processing unit to said external bus by arbitrating for said external bus and then performing a corresponding access on said external bus.

13. An integrated circuit data processor with selectable routing of data accesses, comprising:

an internal instruction bus;

an internal load/store bus;

a central processing unit coupled to said internal instruction bus and to said internal load/store bus, for performing instruction accesses via said internal instruction bus and for performing load/store accesses via said internal load/store bus;

a nonvolatile memory coupled to said internal instruction bus; and a system integration unit coupled to said internal instruction bus, to said internal load/store bus, and to an external bus;

said system integration unit having a register for placing said system integration unit into a selected one of first and second modes;

while in said first mode, said system integration unit routing load/store accesses to said nonvolatile memory from said internal load/store bus to said internal instruction bus;

while in said second mode, said system integration unit routing load/store accesses to said nonvolatile memory, from said internal load/store bus to said external bus, and enabling accesses to said nonvolatile memory from said internal instruction bus;

whereby a plurality of parameters may be stored in an external memory coupled to said external bus for calibration while said central processing unit executes a program stored in said nonvolatile memory.

14. The integrated circuit data processor of claim 13 wherein said system integration unit routes a load/store access to said nonvolatile memory to said internal instruction bus by arbitrating for said internal instruction bus and then performing a corresponding access on said internal instruction bus.

15. The integrated circuit data processor of claim 14 wherein said system integration unit performs said corresponding access on said internal instruction bus by activating a control signal to enable said nonvolatile memory.

16. The integrated circuit data processor of claim 13 wherein said system integration unit routes a load/store access to said external bus by arbitrating for said external bus and then performing a corresponding access on said external bus.

17. The integrated circuit data processor of claim 13 wherein said internal load/store bus includes an address portion, an attribute portion, and a data portion, and wherein said system integration unit detects a load/store access to said nonvolatile memory by detecting that an address conducted on an address portion of said internal load/store bus is within a predetermined range.

* * * * *